US011165734B1

(12) United States Patent
Desserrey et al.

(10) Patent No.: US 11,165,734 B1
(45) Date of Patent: Nov. 2, 2021

(54) MESSAGING SYSTEM SHARE-TO-CHAT

(71) Applicant: Snap Inc., Santa Monica, CA (US)

(72) Inventors: Laurent Desserrey, Los Angeles, CA (US); Dylan Shane Eirinberg, Venice, CA (US); Matthew Colin Grantham, Toronto (CA); Patrick Mandia, Venice, CA (US); David Whyte, Toronto (CA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/948,488

(22) Filed: Sep. 21, 2020

Related U.S. Application Data

(60) Provisional application No. 63/037,449, filed on Jun. 10, 2020.

(51) Int. Cl.
*G06F 3/048* (2013.01)
*H04L 12/58* (2006.01)
*G06F 3/0484* (2013.01)

(52) U.S. Cl.
CPC .......... *H04L 51/22* (2013.01); *G06F 3/04842* (2013.01)

(58) Field of Classification Search
CPC ....... H04L 51/22; G06F 3/04842; G06F 3/048
See application file for complete search history.

(56) References Cited

U.S. PATENT DOCUMENTS

| | | | |
|---|---|---|---|
| 9,608,949 | B2 | 3/2017 | Skyrm et al. |
| 10,374,993 | B2 | 8/2019 | Al Majid et al. |
| 10,474,321 | B2 | 11/2019 | Patel et al. |
| 2009/0037413 | A1* | 2/2009 | Castell ................ G06Q 30/02 |
| 2010/0185951 | A1* | 7/2010 | Nichols .............. H04L 65/4015 |
| | | | 715/738 |
| 2013/0212470 | A1* | 8/2013 | Karunamuni ......... G06F 3/0482 |
| | | | 715/243 |
| 2014/0365912 | A1* | 12/2014 | Shaw ................... G06F 3/0488 |
| | | | 715/748 |

(Continued)

FOREIGN PATENT DOCUMENTS

| | | |
|---|---|---|
| KR | 20150032095 | 3/2015 |
| KR | 101626474 | 6/2016 |

(Continued)

OTHER PUBLICATIONS

TechlogicLife, Feb. 19, 2019, https://www.youtube.com/watch?v=ktx7NzTqEoA (Year: 2019).*

(Continued)

*Primary Examiner* — Jeanette J Parker
(74) *Attorney, Agent, or Firm* — Schwegman Lundberg & Woessner, P.A.

(57) ABSTRACT

A method of sharing an item from an external resource comprises displaying a user interface for the external resource in a messaging application and navigating within the external resource based on user input received in the user interface presented in the messaging application. Upon receipt of selection of an item or state within the external resource based on user input, the identity of one or more recipients is obtained. Information representing the item or state is then transmitted to a device of at least one recipient and information representing the item or state is displayed in a chat interface of a messaging application running on a device of the recipient(s).

19 Claims, 10 Drawing Sheets

(56) References Cited

U.S. PATENT DOCUMENTS

| | | | |
|---|---|---|---|
| 2015/0095512 A1* | 4/2015 | Ali | H04N 21/4305 |
| | | | 709/231 |
| 2016/0072737 A1* | 3/2016 | Forster | H04L 51/36 |
| | | | 709/206 |
| 2016/0234135 A1 | 8/2016 | Kim | |
| 2017/0038927 A1 | 2/2017 | Lewis et al. | |
| 2018/0367483 A1* | 12/2018 | Rodriguez | H04L 51/046 |
| 2020/0004829 A1 | 1/2020 | Denton et al. | |
| 2020/0183943 A1 | 6/2020 | Lupin et al. | |
| 2020/0186489 A1 | 6/2020 | Chen et al. | |
| 2020/0274841 A1* | 8/2020 | Lee | H04L 51/14 |

FOREIGN PATENT DOCUMENTS

| | | |
|---|---|---|
| KR | 101634896 | 6/2016 |
| KR | 101819964 | 1/2018 |

OTHER PUBLICATIONS

"International Application Serial No. PCT/US2021/034539, International Search Report dated Sep. 15, 2021", 3 pgs.
"International Application Serial No. PCT/US2021/034539, Written Opinion dated Sep. 15, 2021", 4 pgs.

\* cited by examiner

MESSAGING SYSTEM SHARE-TO-CHAT

CROSS-REFERENCE TO RELATED APPLICATIONS

This application claims the benefit of U.S. Provisional Patent Application No. 63/037,449 filed on Jun. 10, 2020, the contents of which are hereby incorporated by reference in their entirety.

BACKGROUND

The popularity of users interacting with other users on messaging and social networking applications continues to grow. As these applications have continued to become more sophisticated, the ways in which users can interact has grown significantly. For example, users can both communicate with their friends using messaging applications and can play with friends and other users online in multiplayer games. However, as the applications become more sophisticated, the original messaging or networking effect may become diluted.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
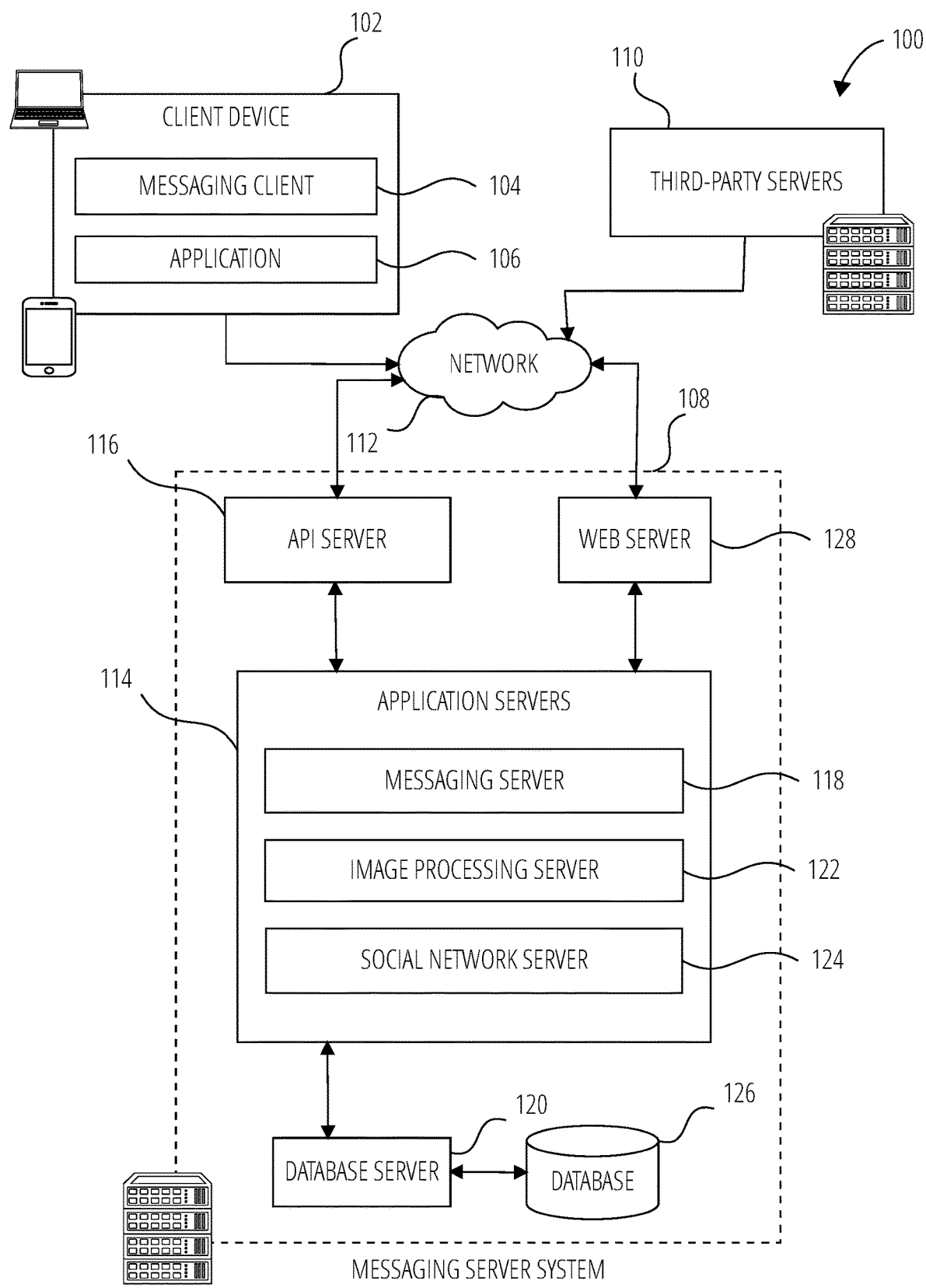
FIG. 1 is a diagrammatic representation of a networked environment in which the present disclosure may be deployed, in accordance with some examples.

As messaging applications have become more sophisticated, in addition to using the messaging application to chat to their friends, messaging applications are supporting more and more additional functions. For example, the user of a messaging application may play any one of a number of solo or multiplayer games that are integrated with the messaging application. Additional functionality may be provided by having the messaging application present a user interface for another application installed on the client device (e.g., a "native application"), or a small-scale version of the application (e.g., an "applet"), that is hosted on the client device or remotely on third-party servers. Such external resources may for example be slimmed down versions of other, existing applications, such as a food ordering or music streaming application. Alternatively, the external resource could be a native application and the messaging application could present a slimmed-down version of the user interface off the native application. By providing a user interface corresponding to an applet or another application within the messaging application, the user of the messaging application can access at least some of the functionality of the existing "full size" application without leaving the messaging application.

The applets may also provide other functionality, and both the applets and applications that are available for access via the user interface of the messaging application may have been provided by the provider of the messaging application or they may have been provided by third parties. Third parties in this instance being third parties with respect to the provider of the messaging application.

As the scope of activities that can be performed on the messaging application has increased, including interacting with applets and applications via the user interface of the messaging application, it may be beneficial to notify friends of the user, and for the user be notified by their friends, of activity taking place in such applets and applications. The disclosed embodiments improve the functionality of messaging application software and systems by providing participants in a conversation in the messaging application with the ability to share an item, status, state or location in an external resource (e.g. an applet or application) into a chat session. In one example, the shared item is in the form of an interactive chat card with which members of the chat can interact, for example, to launch or otherwise access the corresponding external resource, to view specific information within the external resource, or to take the member of the chat to a specific location or state within the external resource. In addition, the interactive chat card might allow the member of the chat to perform an action (e.g. accept an invitation) without having to open the external resource, either within the context of the messaging application or separately. Furthermore, the interactive chat card may include dynamic or contextual information. The disclosed embodiments improve the functionality of messaging application software and systems by providing a unique user interface for users to select an external resource from a list of two or more currently active or recently used applets.

Specifically, the disclosed embodiments provide an improved messaging application GUI that enables users to quickly share into a chat session information from an external resource. The disclosed embodiments also streamline the process by which chat participants can launch or otherwise access an external resource or view information about the same, or enter an external resource at a particular location or state. This expands the user experience, increases sharing options in the messaging platform, and reduces the number of steps a user has to perform to select and launch an external resource. For example, the disclosed embodiments reduce the number of screens a user has to navigate through to access, launch or reach a given state or location or item of information in an external resource.

In one example, a method of sharing an item from an external resource running in a messaging application comprises displaying a user interface for the external resource in a messaging application, navigating within the external resource based on user input received in the user interface presented in the messaging application, receiving selection of an item or state within the external resource based on user input, receiving identification of one or more recipients based on user input, transmitting information representing the item or state to a device of at least one recipient, and displaying information representing the item or state in a chat interface of a messaging application running on a device of the at least one recipient.

The method may further comprise generating the item or the state in a version of the external resource running on the device of the at least one recipient in response to recipient interaction with the displayed information, and the chat interface may comprise a group chat. Additionally, the step of displaying of information may comprise displaying a call-to-action button. The method may further comprise returning to the state or item in the external resource after transmitting the information.

Still further, the method may also include, in response to receiving selection of an item or a state within the external resource, displaying an address book user interface, receiving identification of at least one recipient listed in the address book user interface, and transmitting information representing the item or state to a device of the at least one recipient. Receiving identification of one or more recipients based on user input may occur in a chat interface of the messaging application. The method may return to the state or item in the external resource after transmitting the information.

Additionally, information representing the item or state may be dynamically determined and the call-to-action button may define an action that does not require generating the item or the state in a version of the external resource running on the device of the at least one recipient.

Also disclosed is a system comprising one or more processors of a machine, a display, and a memory storing instructions for sharing an item or state from an external resource accessed via a messaging application. The instructions, when executed by at least one processor among the one or more processors, cause the machine to perform operations comprising displaying a user interface for the external resource in the messaging application, navigating within the external resource based on user input received in the user interface presented in the messaging application, receiving selection of an item or state within the external resource based on user input, receiving identification of one or more recipients based on user input, transmitting information representing the item or state to a device of at least one recipient thereby to enable the display of information representing the item or state in a chat interface of a messaging application running on the device of the at least one recipient.

The transmitted information may comprise parameters for a call-to-action button and the system may return to the state or item in the external resource after the transmitting operation. The call-to-action button may define an action that does not require generating the item or the state in a version of the external resource running on the device of the at least one recipient. The operations may also further comprise in response to receiving selection of an item or a state within the external resource, displaying an address book user interface, receiving identification of at least one recipient listed in the address book user interface, and transmitting information representing the item or state to a device of the at least one recipient.

The address book user interface may be an address book interface from the messaging application and the operation of receiving identification of one or more recipients based on user input may occur in a chat interface of the messaging application. The information representing the item or state may be dynamically determined.

Also disclosed is a non-transitory machine-readable storage medium embodying instructions for providing sharing of an item or state from an external resource running in a messaging application. The instructions, when executed by a device including a display, cause the device to perform operations comprising displaying a user interface for the external resource in the messaging application, navigating within the external resource based on user input received in the user interface presented in the messaging application, receiving selection of an item or state within the external resource based on user input, receiving identification of one or more recipients based on user input, and transmitting information representing the item or state to a device of at least one recipient thereby to enable the display of information representing the item or state in a chat interface of the messaging application running on the device of the at least one recipient.

The transmitted information may comprise parameters for a call-to-action button and the operations may further comprise returning to the state or item in the external resource after the transmitting operation. The call-to-action button may define an action that does not require generating the item or the state in a version of the external resource running on the device of the at least one recipient. The operations may further comprise, in response to receiving selection of an item or a state within the external resource, displaying an address book user interface, receiving identification of at least one recipient listed in the address book user interface, and transmitting information representing the item or state to a device of the at least one recipient.

The address book user interface may be an address book interface from the messaging application and the operation of receiving identification of one or more recipients based on user input may occur in a chat interface of the messaging application. The information representing the item or state may be dynamically determined.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
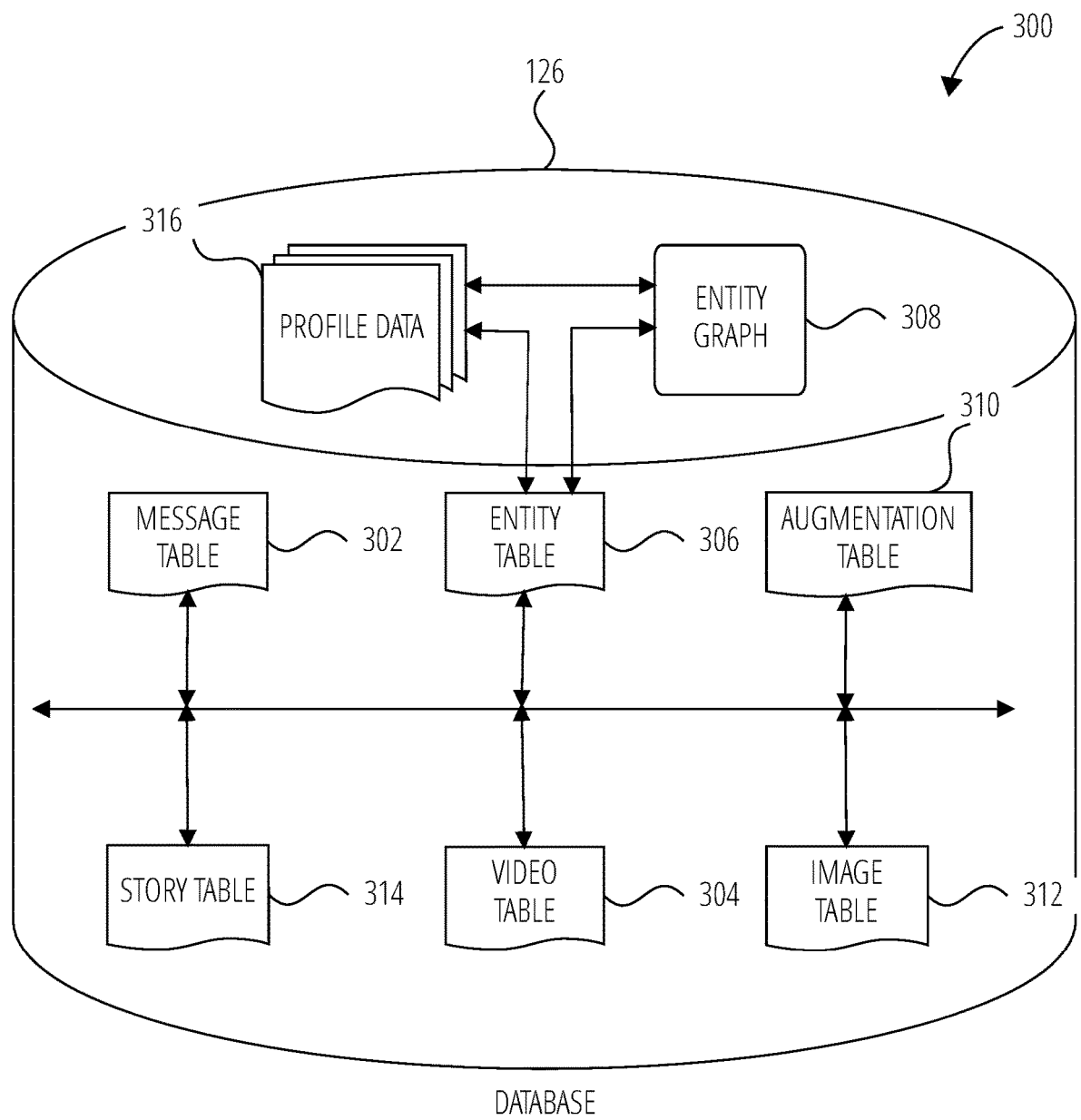
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to, or additional to or optional to the messaging client 104. The external resource is often provided by a third party but may also be provided by the creator or provider of the messaging client 104. The messaging client 104 receives a user selection of an option to launch, or otherwise access features of, such an external resource. The external resource may be the application 106 installed on the client device 102 (e.g., a "native application"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch, or otherwise access features of, the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch or otherwise access the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or otherwise access a given external resource. This list can be presented in a context-sensitive menu. For example, the icons representing different ones of the application 106 (or applets) can vary based on how the menu is launched or accessed by the user (e.g., from a conversation interface or from a non-conversation interface).

System Architecture

Figure 2:
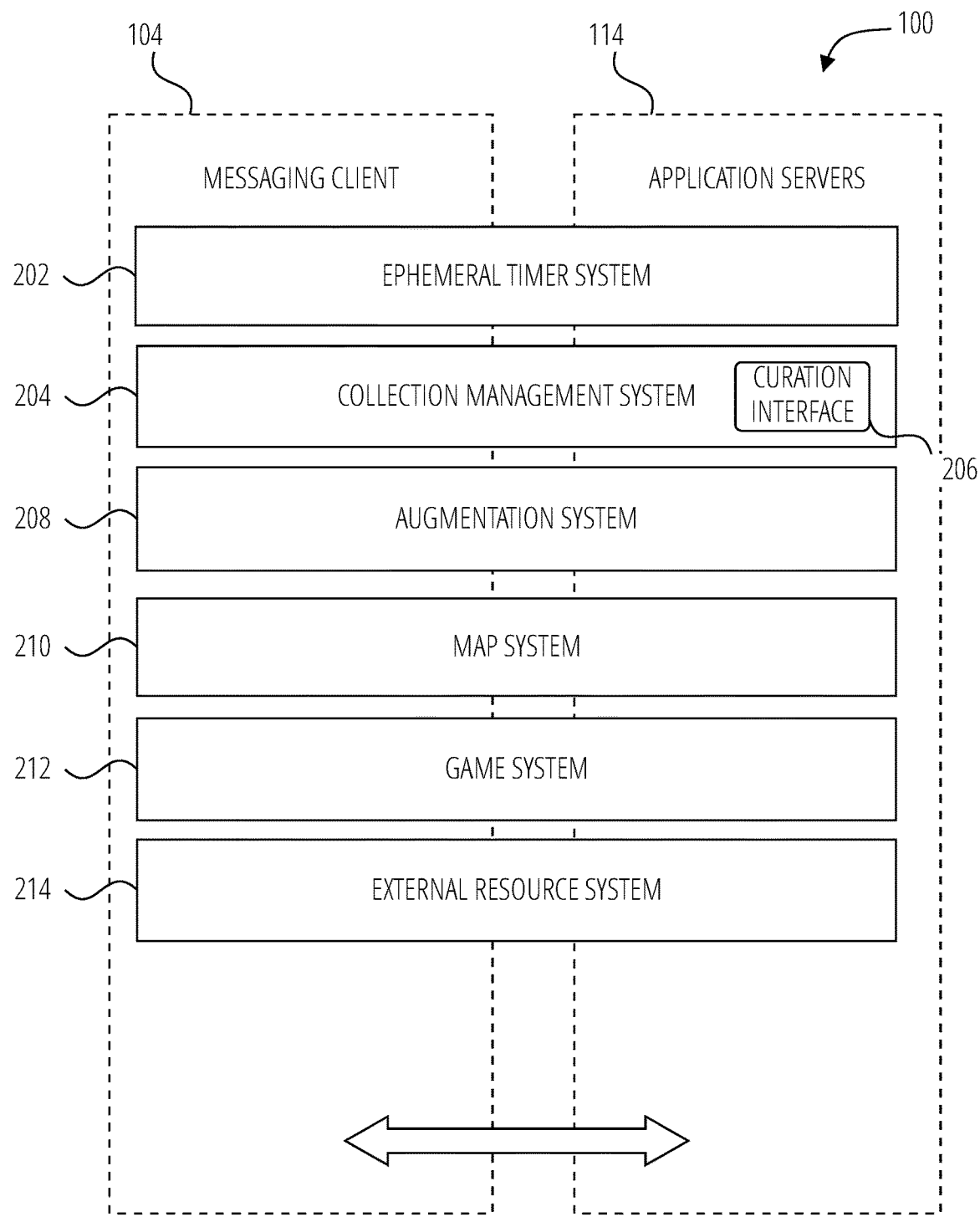
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, and an external resource system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched or otherwise accessed by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g. third-party servers 110) to launch or access external resources, e.g. applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource.

In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
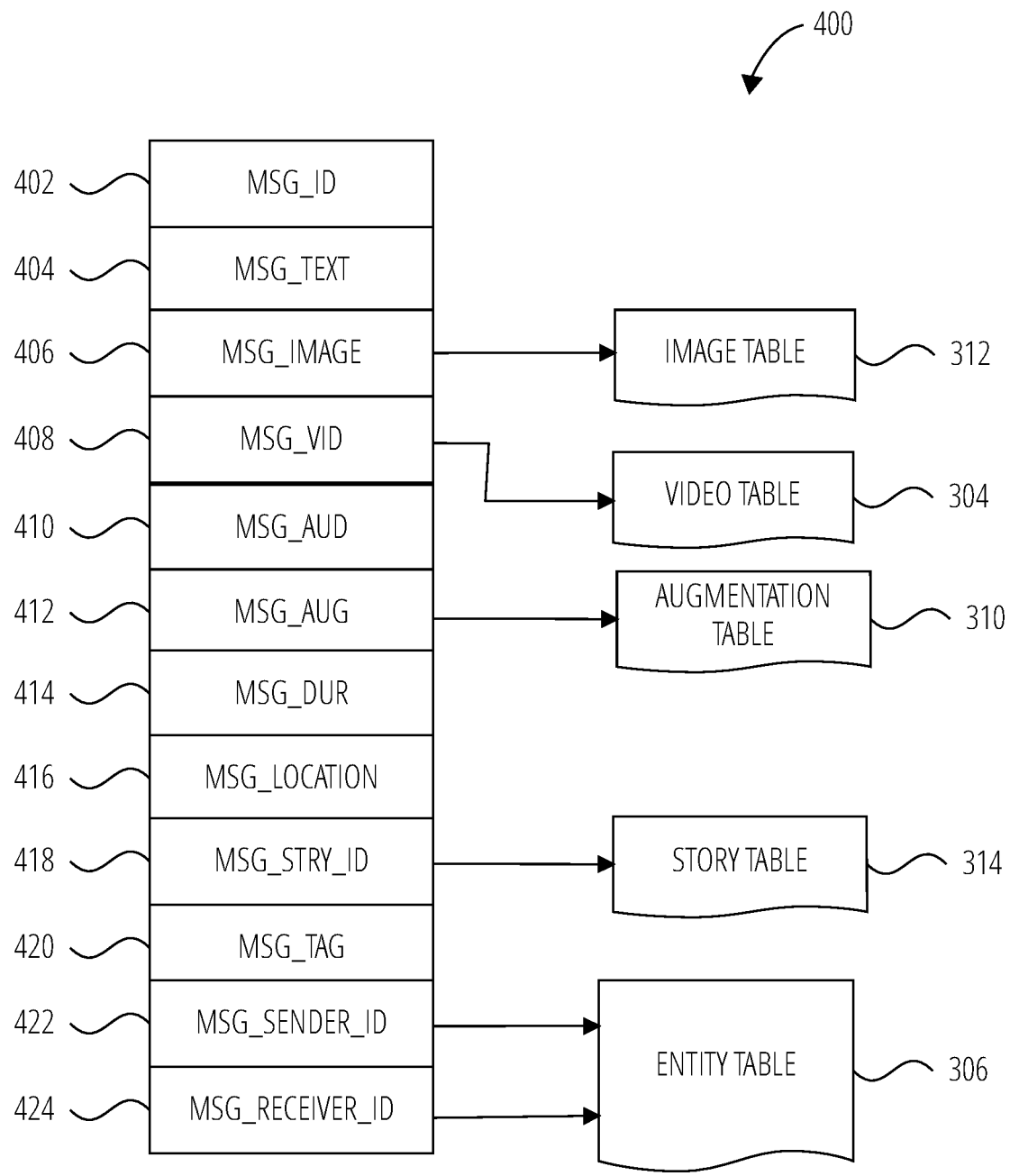
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Figure 5:
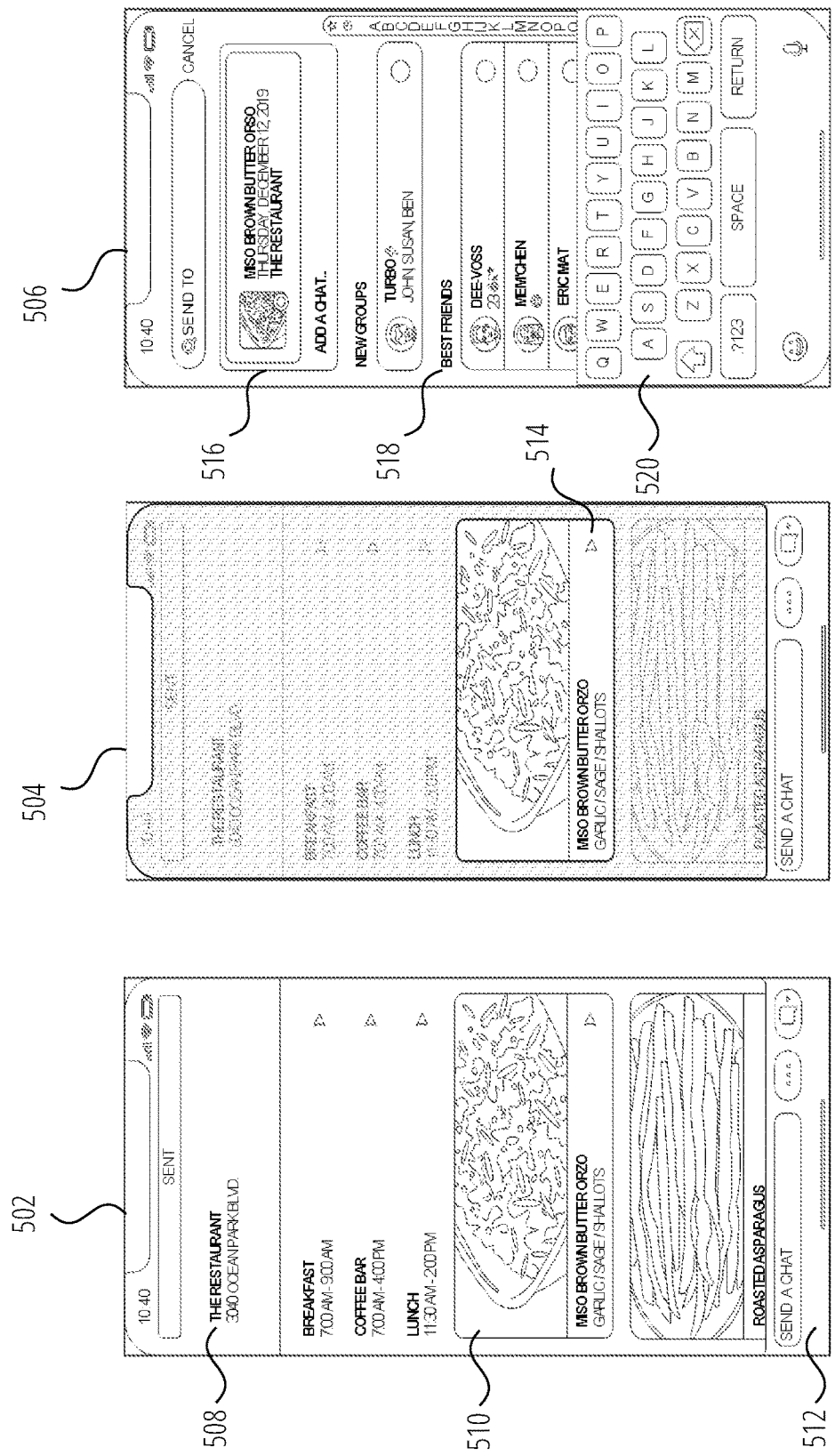
FIG. 5 shows an example sequence of interfaces presented to a user, in accordance with some examples.

FIG. 5 shows an example sequence of user interfaces presented to a user of a client device 102 who is using or accessing an external resource (e.g., an application 106 or applet) within the context of messaging client 104, and wishes to share an aspect, state or item within the external resource in a conversation (or "chat") taking place on the messaging client 104.

User interface 502 shows an interface of an external resource 508 (a restaurant applet entitled "The Restaurant" in the example), which the user has launched from and/or is accessing from within the messaging client 104. At least some of the context of the messaging client 104 has been preserved in user interface 502, as can be seen from the chat interface 512 at the bottom of user interface 502.

The external resource 508 is navigable by the user of the messaging client 104, for example by selecting meals such as "Breakfast" or "Lunch" to open and display a list of available menu items, such as external resource item 510, which is a menu item in the illustrated embodiment. Further details of the external resource item 510 may be shown in response to the user tapping on user interface 502 over external resource item 510.

In the course of navigating the user interface 502, the user can select external resource item 510 to share it to a chat session. The user can initiate sharing of this item by first selecting the external resource item 510 (e.g. by pressing and holding on the external resource item 510). The user interface 502 then transitions to user interface 504, in which a visual indication is provided that the external resource item 510 has been selected, for example by providing a translucent grey overlay over the rest of the user interface 504 thereby to highlight the external resource item 510. Also provided is a forward arrow 514 that can be selected by the user tapping thereon.

In response to a tap on the forward arrow 514, the user interface 506 is displayed, comprising a card preview 516, an address book 518 and a keyboard 520. The card preview 516 as shown to the sender includes, as its name suggests, at least some of the visual elements that will be seen by the recipient, including in the illustrated example the external resource name, a thumbnail image, a title of the card that is related to the information that is being forwarded, and a short text description of the card. Also accompanying the card when sent is metadata including an image, title, description string and CTA (Call-to-Action) string, as the data that the messaging client 104 of the recipient(s) will use to populate the card when received. The CTA string will also include any relevant information relating to the state of the external resource 508. For example, if the external resource is a game, and the call-to-action is "Join me in the game!" then the CTA string may include information relating to the identification of the sender's game session and the state or location of the sender in the game.

In user interface 506, the user is able to select an existing group of people or one or more individuals from the address book 518, to whom the card is to be sent. The user can also manually enter a username using the keyboard 520. When the desired recipients have been selected, the user can press "Return" on the keyboard or press a "Send" UI button to initiate delivery of a card representing the external resource item 510 to the selected recipients. The user is then returned to user interface 502 in the app, in which the external resource item 510 is no longer selected.

The sequence of user interfaces in FIG. 5 provide a convenient means for a user to send an invitation to play or use a game or non-game external resource, express and share excitement (e.g. including but not limited to a new achievement, a match result, a newly unlocked content) and otherwise notify friends of a user's external resource experience, and also provide a call for action that may encourage the recipient's participation in the external resource.

Figure 6:
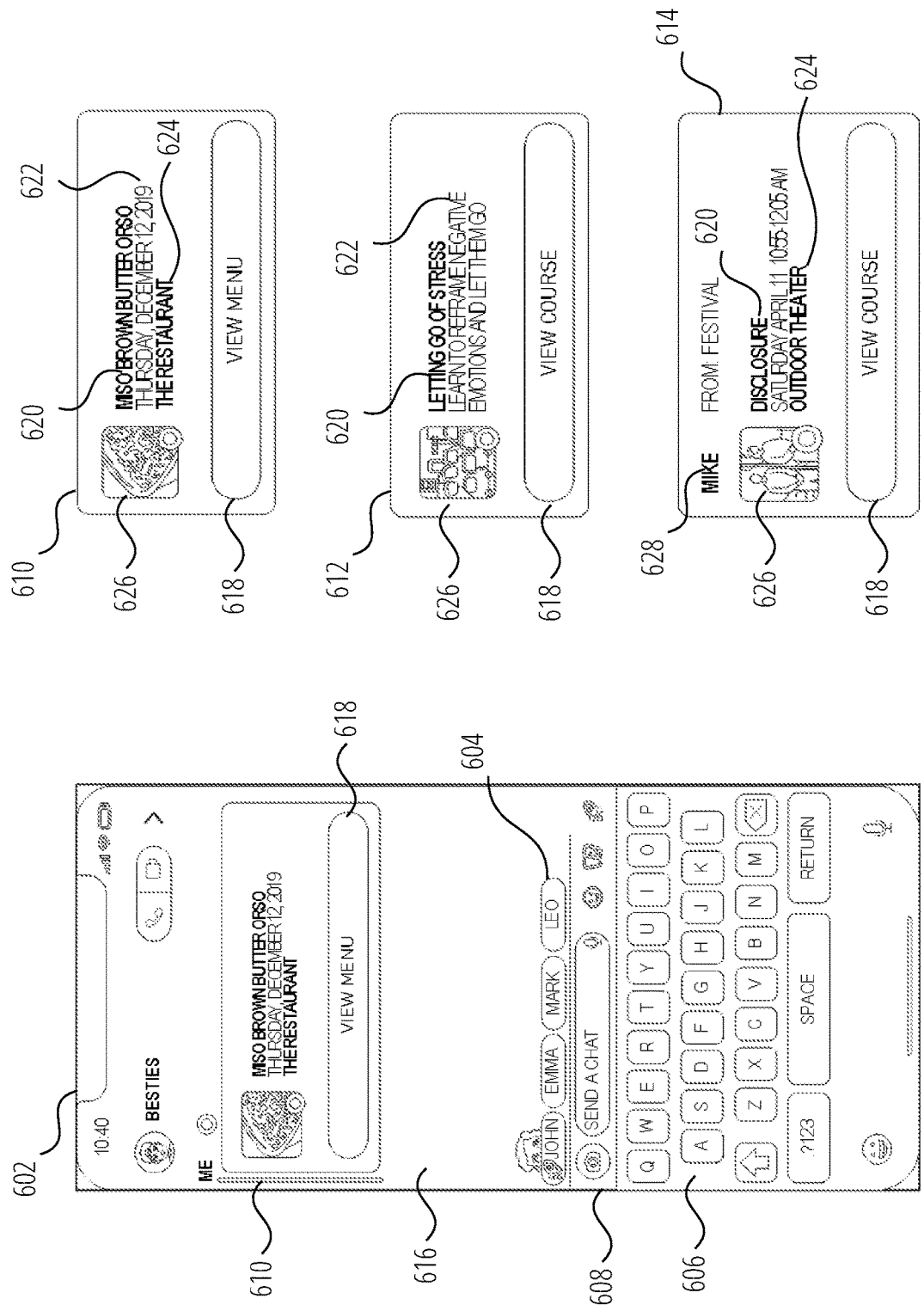
FIG. 6 illustrates a user interface presented to a recipient of a shared item card, as well as examples of cards that may be presented, in accordance with some examples.

FIG. 6 illustrates a user interface 602 that is presented to a recipient of the shared item, as well as examples of cards that may be presented. As can be seen, the user interface 602 is a chat interface, which in the illustrated example shows a group chat in a group entitled "Besties."

The user interface 602 includes conventional chat features such as a presence region 604 that presents visual identifiers of participants in the group conversation. Underneath the presence region, the messaging application presents a plurality of conversation options 608 and a keyboard 606. The conversation options 608 include a text entry box in which a participant can type a message using the keyboard. When sent, the message is presented as a chat bubble above the presence information in region 616. Other conversation options include a camera option allowing a user to take a picture or video for submission to the conversation as a message in a chat bubble, and a rocket icon for accessing games.

As can be seen from the figure, card 610, which has been received from one of the other conversation participants as discussed above with reference to FIG. 5, is presented as a chat bubble in the conversation. A conversation participant who has received the card 610 can interact with it by pressing the card 610's Call-to-Action button 618. In response, the external resource corresponding to the card 610 is launched or otherwise accessed, and the conversation participant is then taken to an item, state or location in the external resource as defined by the Call-to-Action string that accompanied the card 610. Alternatively, additional information corresponding to the card is provided, a website is opened, or other action is provided, depending on the contents of the card 610. The contents of and any location specified by the Call-to-Action string are determined by the developer of the external resource, as is what will appear in the card and how it appears, within the limitations of the card 610.

The elements of example cards 610, 612 and 614 are shown on the right hand side of FIG. 6. As can be seen, the cards all include a Call-to-Action button 618, a title 620, a description 622 and a thumbnail image 626. Card 610 and card 612 each include an external resource name 624. Card 614 also includes a header 628 that includes the name of the person who sent the card (Mike) and the originator of the card (Coachella), which might be different from the external resource name.

Which of the card elements to include can be determined by the external resource developer. As can be seen from FIG. 6, different implementations are possible and likely, depending on the nature of the external resource corresponding to the card (e.g. whether it is a game or a non-game external resource). For example the Call-to-Action button 618 is different for each of the cards shown on the right hand side of FIG. 6.

Figure 7:
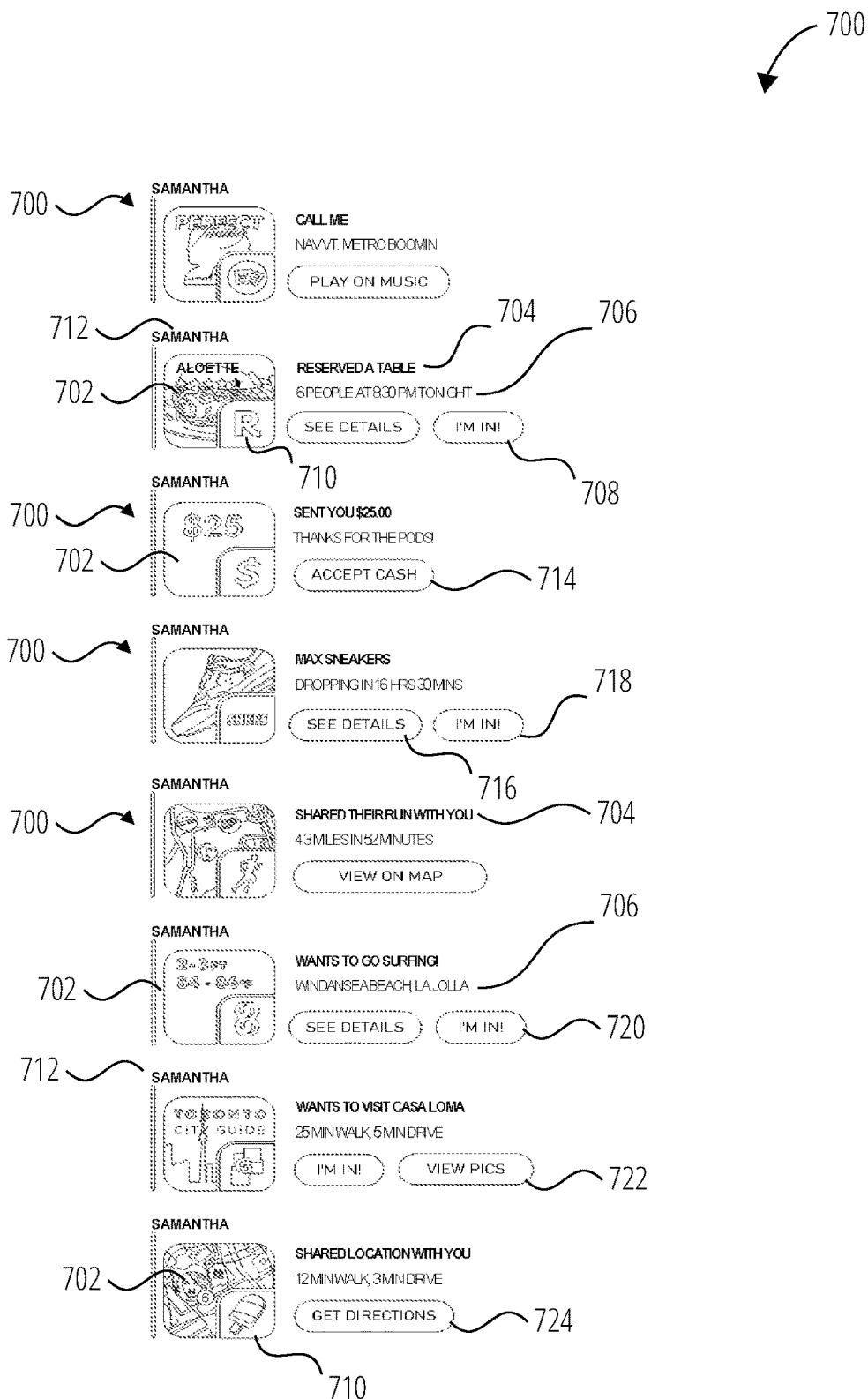
FIG. 7 illustrates examples of cards that may be presented to a recipient, in an alternative embodiment, in accordance with some examples.

FIG. 7 illustrates examples of cards 700 that may be presented to a recipient, in an alternative embodiment. In this embodiment, the cards support dynamic and contextual functionality.

Each card 700 includes a live, active or dynamic thumbnail 702, a title 704 & description 706, one or more Call-to-Action buttons 708, and a user name 712 corresponding to the sender of the card 700. For purposes of clarity, not all instances of these items in FIG. 7 have been marked with reference numerals. The dynamic thumbnail 702 contains a background image and contextual or dynamic information pertaining to what is being shared from the external resource. For example, if the user has booked a dinner reservation, and selects and transmits a card representing this to one or more friends in a chat session, the dynamic thumbnail could include a photo from the restaurant, the name of the restaurant and the restaurant's current star rating. In another example, if a user shares a card inviting friends to join them surfing, the dynamic thumbnail 702 could include information relating to conditions at the relevant beach, for example wave height and water temperature. The relevant information in the dynamic thumbnail 702 can be obtained by the messaging client 104 or the external resource at the time of creation of the card 700 by the sender, after which the dynamic thumbnail 702 may have a static appearance. Alternatively, the information in the dynamic thumbnail 702 can be updated at the recipient's device when viewed or accessed by the recipient, such as when the messaging client 104 is launched. The dynamic thumbnail 702 may also include an icon 710 corresponding to the external resource.

The dynamic information in the dynamic thumbnail 702 is obtained by querying an appropriate server whether the relevant dynamic information is generated or stored. For example, third-party servers 110 maintaining weather information, surf conditions, restaurant ratings, product or service recommendations, new movie or music releases and ratings etc. In some cases the dynamic information may be stored or generated in a messaging server 118 or in a third-party server 110 hosted by or for the provider of the external resource. In response to being queried, the relevant server, or other repository of data, responds with appropriate dynamic data, corresponding to the relevant dynamic condition(s), which data can then be incorporated into or used to generate dynamic thumbnail 702.

The title 704 and description 706 are substantially similar to the title 620 and description 622 discussed with reference to FIG. 6. In this embodiment however, custom formatting for the title or description template can be defined by the developer of the external resource, to change the style or prominence of the text comprising the title 704 or description 706.

The Call-to-Action buttons 708 allow recipients to perform actions pertaining to the external resource as described with reference to FIG. 6, but in addition, actions can be specified that take place without the Call-to-Action button 708 having to launch, access or present a user interface (directly or in the context of the messaging client 104) of the external resource. This is accomplished by the messaging client 104 providing appropriate calls to the external resource or to a further resource related to the external resource or card, without providing the user with an interface to the external resource.

For example if a sender books a dinner reservation and sends a corresponding card 700, the recipient of the card 700 can join the reservation just with a tap of the relevant Call-to-Action button 708. Associated actions associated with accepting the reservation, such as notifying the originator, adding a reminder or a calendar entry to the recipient's calendar, and updating the guest list and available openings in the reservation can take place without opening the external resource or requiring further input from the user, other than perhaps responding to prompts ("How many?" or "Should I put this in your calendar?") or dismissing notifications "You're In! (OK)/(Cancel)."

Similarly, if a friend shares a pair of sneakers, the Call-to-Action buttons 708 may allow the recipient to add them to a wish list or online shopping cart, or start tracking price changes, either with our without requiring the external resource to be launched or presented in the context of the messaging application. In another example, if a sender sends a card 700 representing a song, the recipient may be presented with Call-to-Action buttons 708 that allow the recipient to choose to listen now, add to a play queue, or rate the song. If, for example, the corresponding external resource (e.g. music applet or native application) is running in the background, the song could be played or added to the play queue without having to surface the external resource. This is accomplished by the messaging client providing appropriate calls to the external resource or to a further resource related to the external resource or card, without providing the user with an interface to the external resource.

In addition to taking actions without having to launch or present a user interface for the originating resource, the Call-to-Action button 708 could alternatively open an interface to the originating external resource at a defined location or state, perform an on-platform action in the messaging client 104 (like take a photo or put a pin on a map), or present another destination altogether (a different external resource, a web page, etc.). The Call-to-Action buttons 708 and their actions are specified by the developer; either created independently or easily inserted (in the case of on-platform actions).

Examples of Call-to-Action buttons 708 illustrated in FIG. 7 include Call-to-Action button 714 to accept money that has been sent to the recipient. Upon the user selecting Call-to-Action button 714, the appropriate acceptance and transfer can take place without having to open the corresponding money-transfer external resource. Also shown is include Call-to-Action button 716 to show more details, which is likely to open the external resource either within the context of the messaging client 104 (i.e. an applet), or provide a user interface to or open the external resource itself at an appropriate location or status.

Call-to-Action button 718 is a commerce-related button that can for example put the item in a wish-list or online shopping cart, or start tracking price changes. Upon the user selecting Call-to-Action button 718, the appropriate action can take place without having to open the corresponding online shopping external resource. Call-to-Action button 720 is an "accept invitation" button. Upon the user selecting Call-to-Action button 718, the appropriate acceptance, RSVP, etc. can take place without having to open the corresponding external resource.

Call-to-Action button 722 is an on-platform button that takes action within the messaging client 104, to for example view on-platform media captured by users of messaging client 104, e.g. user photos or videos. Upon the user selecting Call-to-Action button 722, the appropriate action will take place within the messaging client 104. Call-to-Action button 724 is a map-related button that provides directions to a location that has been shared by the sender of the card. Upon the user selecting Call-to-Action button 724, the appropriate map-related third party resource is opened, either within the context of the messaging client 104 (e.g. an applet), or by providing a user interface to, or opening the external resource itself at an appropriate location or status, such as at a map display showing directions from the recipient's current location to the sender's location.

Figure 8:
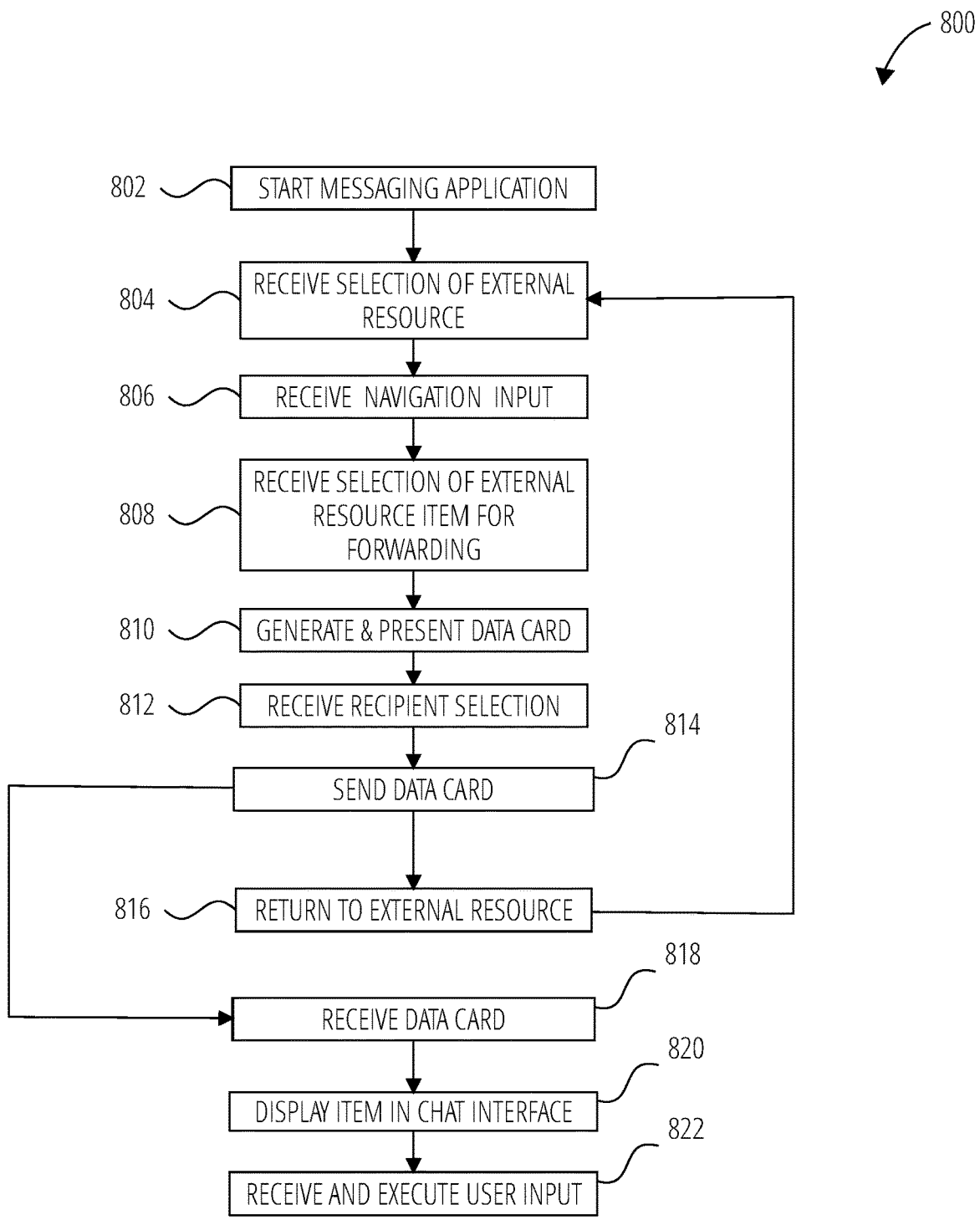
FIG. 8 is a flowchart illustrating a method for generating and presenting user interface elements, in accordance with some examples.

FIG. 8 is a flowchart illustrating a method for generating and presenting the user interface elements described above with reference to FIG. 5, FIG. 6 and FIG. 7.

The method commences with the client device 102 receiving user selection of the messaging client 104 to bring it into a state in which the user can interact with the messaging client 104, such as by launching the messaging client 104 in response to tapping its icon, or receiving user input to bring it to the foreground, at operation 802. Alternatively, the user may otherwise have been using the messaging client 104, in which case it will not be necessary to launch it as in operation 802, as it would already state in which the user can interact with it.

From its home or other UI screen, messaging client 104 receives user selection of an external resource to launch or otherwise access at operation 804. The user can then interact with the external resource from within the context of the messaging application, including by navigating the external resource within the context of the messaging client 104 at operation 806 as discussed above with reference to FIG. 5.

When the user reaches a certain state or location within the external resource that presents content that can be shared (e.g. the user interface 502), the user may then select an item (e.g. external resource item 510) to be shared in a chat/conversation in (e.g. external resource item 510, selected for forwarding by pressing forward arrow 514 as discussed in FIG. 5.) In response to receiving user selection of an external resource item to be shared in operation 808, the messaging client 104 generates and presents a preview of the data card to the sender in operation 810. If there are any optional elements to be included with the data card, these can now be selected by the sender.

The generation of the data card in operation 810 is based on a template provided by the developer of the external resource or by the messaging clients 104. The template defines contents to be included in the card as discussed above, including thumbnail images, call-to-action buttons, titles etc. Operation 810 involves populating the data card with information derived from the user state or location in the external resource, user selections and any other required details (e.g. the time of and number of people in a dinner reservation) specified by the template or selected by the user. In the case where the thumbnail is dynamic and contextual as described with reference to FIG. 7, the external resource or messaging client 104 may retrieve appropriate information (e.g. the current star rating of a restaurant, surf conditions etc.) for use in populating the card, if this information has not already been obtained by the external resource.

Upon receiving confirmation/acceptance of the preview of the data card from the sender, the messaging client 104 then presents a messaging client 104 address book interface, e.g. user interface 506 in FIG. 5. The messaging client 104 then receives user selection of recipients at operation 812 via the address book interface. In response to the messaging client 104 receiving appropriate user input, for example by the user pressing an enter or send or other execute button, a data card or data set corresponding to the relevant information related to the external resource item is transmitted by the messaging client 104 of client device 102 to the client devices 102 of selected recipients in operation 814 via the network 112 and messaging server system 108.

The messaging client 104 then returns to the display of the external resource in operation 816, in the context of the messaging client 104 and in the same state of the external resource in which item was selected for forwarding in operation 808. The user is then free to continue navigating the external resource, which may include exiting the external resource to return to the full user interface of the messaging client 104.

As discussed above with reference to FIG. 5 and FIG. 6, the data card may comprise the external resource name, a thumbnail image, a title of the card that is related to the external resource item 510, a short text description of the card and CTA (call-to-action) string, which is used by a recipient's messaging client 104 to present the card to the recipient, and any other pertinent information. Also as described with reference to FIG. 7, the data card may include a dynamic thumbnail 702 containing a background image and contextual or dynamic information pertaining to what is being shared from the external resource. The CTA string may also define an action that takes place either with or without requiring the external resource 508 to be launched or presented in the context of the messaging application. The CTA string could also alternatively define an action that opens an interface to the originating external resource at a defined location or state, performs an on-platform action in the messaging client 104 (like take a photo or put a pin on a map), or presents another destination altogether (a different external resource, a web page, etc.).

When the data card is sent by the client device 102 in operation 814, it is transmitted over network 112 via messaging server system 108 to the client devices 102 of recipients that have been indicated in operation 808. When a recipient's client device 102 receives the data card at operation 818, the data in the card is extracted and is used to generate a display corresponding to the item, such as card 610 corresponding to external resource item 510, on the client device 102 in a chat interface at operation 820. In the event that more than one recipient has been selected in operation 810, the item is displayed in a group chat interface that is provided by the messaging client 104 at the client devices 102 of all the selected recipients.

As seen in operation 822, the recipient may then interact with the card as displayed, and any action corresponding to the recipient user's input is then executed. For example, the messaging client 104, upon receiving user selection of the CTA button, will take the action specified in the CTA string received in the data card. For example, an external resource corresponding to the card may be launched, and the recipient is then taken to a state or location in the external resource as defined by the CTA string that accompanied the card. Alternatively, additional information corresponding to the card is provided, or a website is opened, such as defined by the CTA button and as described in more detail above. The contents of, actions taken by, or any physical or virtual location specified by the CTA string are determined by the developer of the external resource.

In the event that the card includes a dynamic thumbnail 702, the information in the dynamic thumbnail may be updated by the recipient's messaging client 104 at the time the messaging client is launched or surfaced, or the card is viewed. Furthermore, as discussed with reference to FIG. 7, an action may be taken in response to the CTA button that does not require launching, access or presentation to the user of the external resource. This is accomplished by the messaging client 104 providing appropriate calls to the external resource or to a further resource related to the external resource or card, without providing the user with an interface to the external resource.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Machine Architecture

Figure 9:
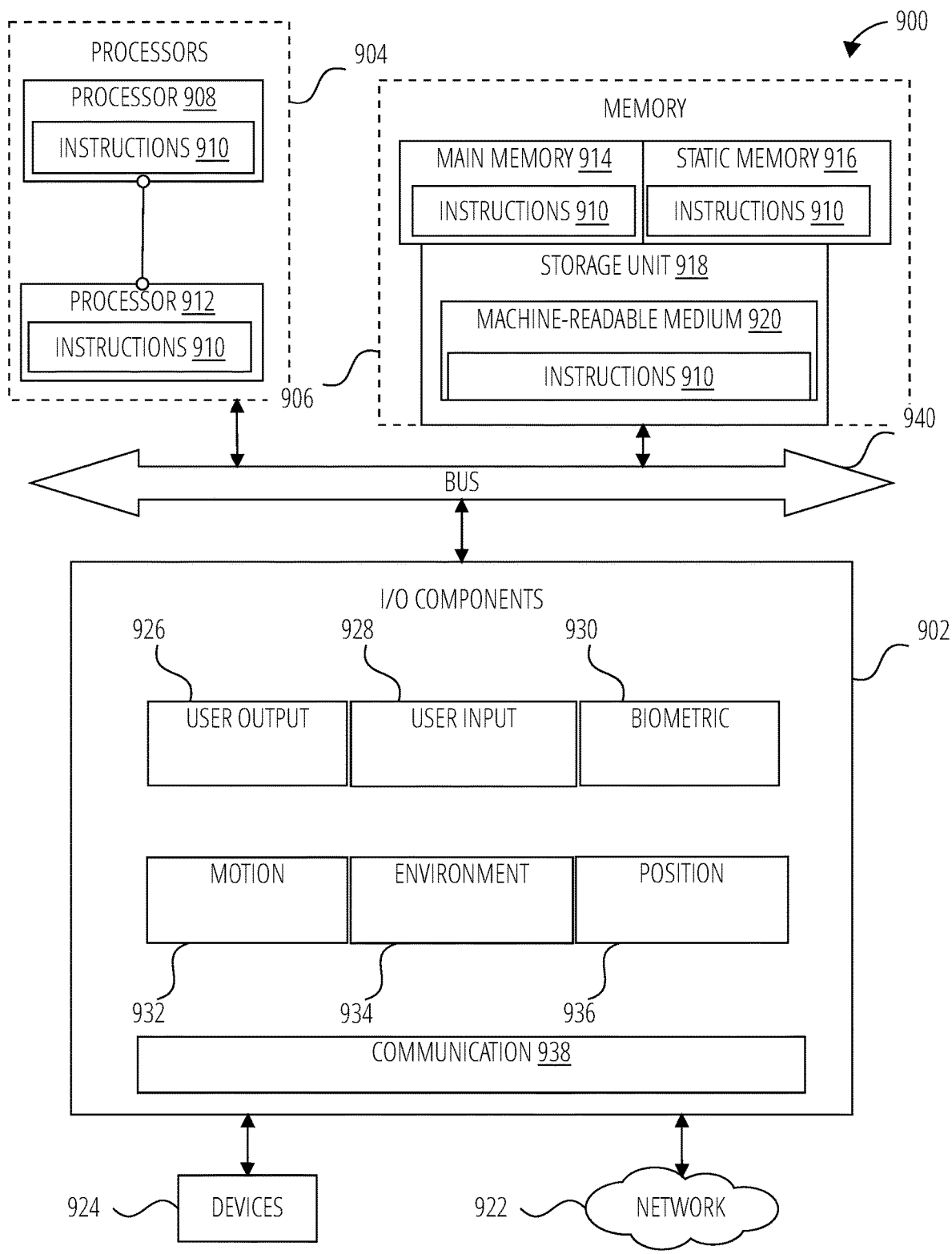
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 902, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface Component or another suitable device to interface with the network 922. In further examples, the communication components 938 may include wired communication components, wireless communication components, cellular communication components, Near Field Communication (NFC) components, Bluetooth components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Software Architecture

Figure 10:
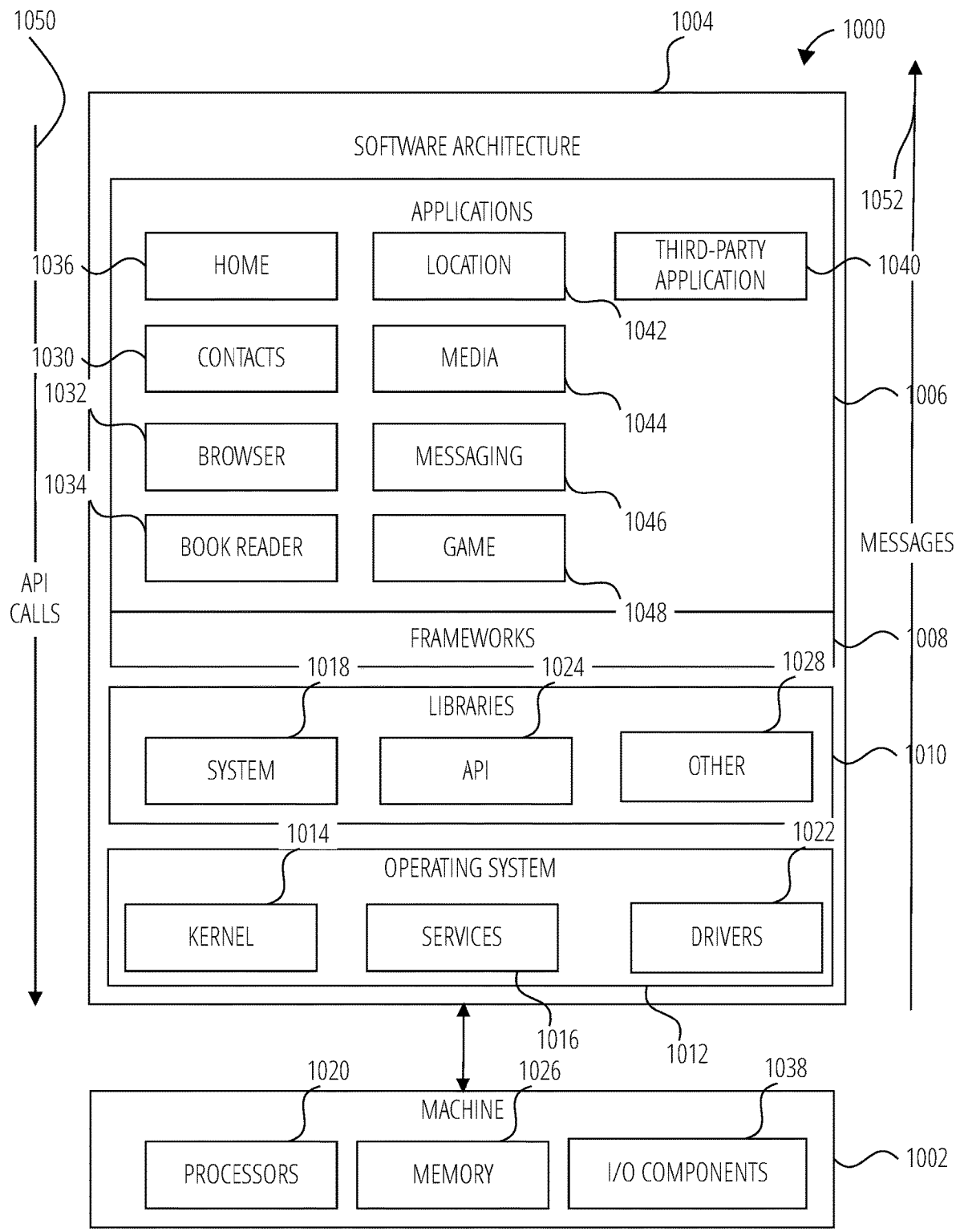
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROIDT™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE)

standard, others defined by various standard-setting organizations, other long-range protocols, or other data transfer technology.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

The invention claimed is:

1. A method of sharing an item from an external resource, comprising:
displaying, on a first computing device, a user interface for the external resource in a messaging application;
navigating within the external resource based on user input received in the user interface presented in the messaging application;
receiving selection of an item or state within the external resource;
receiving identification of a recipient;
transmitting information representing the item or state to a second computing device associated with the identified recipient, wherein information representing the item or state is displayable in a chat interface of a messaging application running on the second computing device;
returning to the state or item in the external resource on the first device without presenting the item or state in a chat bubble on the first device;
navigating further within the external resource based on user input after the return to the state or item in the external resource;
receiving user input to exit the external resource;
exiting the external resource in response to the user input; and
in response to exiting the external resource, returning to a full user interface of the messaging application.

2. The method of claim 1 wherein:
the item or the state is generated on the second computing device in a version of the external resource running on the second computing device in response to interaction with the displayed information on the second computing device.

3. The method of claim 1, wherein the transmitted information comprise information for displaying a call-to-action button.

4. The method of claim 1, further comprising:
in response to receiving selection of the item or a state within the external resource, displaying an address book user interface listing the recipient; and
wherein receiving identification of the recipient is based on a selection of the recipient listed in the address book user interface.

5. The method of claim 1, wherein the receiving identification of the recipient based on user input occurs in a chat interface of the messaging application.

6. The method of claim 1 wherein information representing the item or state is dynamically determined based on data retrieved from a repository of data corresponding to dynamic conditions.

7. The method of claim 3 wherein the call-to-action button defines an action that does not require generating the item or the state in a version of the external resource running on the second computing device.

8. A system comprising:
one or more processors of a machine, a display; and
a memory storing instructions for sharing an item or state from an external resource accessed via a messaging application on a first device, the instructions when executed by at least one processor among the one or more processors, causes the machine to perform operations comprising:
displaying a user interface for the external resource in a messaging application; navigating within the external resource based on user input received in the user interface presented in the messaging application,
receiving selection of an item or state within the external resource; receiving identification of a recipient;
transmitting information representing the item or state to a computing device associated with the identified recipient, wherein reception of the transmitted information enables the display of information representing the item or state in a chat interface of a messaging application running on the computing device associated with the identified recipient;
returning to the state or item in the external resource without presenting the item or state in chat bubble on the first device;
navigating further within the external resource based on user input after the return to the state or item in the external resource;
receiving user input to exit the external resource;
exiting the external resource in response to the user input; and
in response to exiting the external resource, returning to a full user interface of the messaging application.

9. The system of claim 8 wherein the transmitted information comprises parameters for a call-to-action button.

10. The system of claim 9 wherein the call-to-action button defines an action that does not require generating the item or the state in a version of the external resource running on the computing device associated with the identified recipient.

11. The system of claim/wherein the operations further comprise:
in response to receiving selection of the item or a state within the external resource, displaying an address book user interface listing the recipient; and
wherein receiving identification of the recipient is based on a selection of the recipient listed in the address book user interface.

12. The system of claim 11 wherein the address book user interface is an address book interface from the messaging application.

13. The system of claim 8 wherein information representing the item or state is dynamically determined based on data retrieved from a repository of data corresponding to dynamic conditions.

14. A non-transitory machine-readable storage medium embodying instructions for providing sharing of an item or state from an external resource running in a messaging application, the instructions, when executed by a first computing device including a display, cause the first computing device to perform operations comprising:
displaying a user interface for the external resource in a messaging application; navigating within the external resource based on user input received in the user interface presented in the messaging application;
receiving selection of an item or state within the external resource; receiving identification of a recipient;
transmitting information representing the item or state to a second computing device associated with the identified recipient, wherein reception of the transmitted information enables the display of information representing the item or state in a chat interface of a messaging application running on the second computing device associated with the identified recipient;
returning to the state or item in the external resource on the first device without presenting the item or state in a chat bubble on the first device;
navigating further within the external resource based on user input after the return to the state or item in the external resource;
receiving user input to exit the external resource;
exiting the external resource in response to the user input; and
in response to exiting the external resource, returning to a full user interface of the messaging application.

15. The non-transitory machine-readable storage medium of claim 14 wherein the transmitted information comprises parameters for a call-to-action button.

16. The non-transitory machine-readable storage medium of claim 15 wherein the call-to-action button defines an action that does not require generating the item or the state in a version of the external resource running on the second computing device.

17. The non-transitory machine-readable storage medium of claim 14 wherein the operations further comprise:
in response to receiving selection of the item or a state within the external resource, displaying an address book user interface listing the recipient; and
wherein receiving identification of the recipient is based on a selection of the recipient listed in the address book user interface.

18. The non-transitory machine-readable storage medium of claim 14 wherein information representing the item or state is dynamically determined based on data retrieved from a repository of data corresponding to dynamic conditions.

19. The non-transitory machine-readable storage medium of claim 14 wherein the receiving identification of the recipient based on user input occurs in a chat interface of the messaging application.

\* \* \* \* \*

UNITED STATES PATENT AND TRADEMARK OFFICE
CERTIFICATE OF CORRECTION

PATENT NO. : 11,165,734 B1
APPLICATION NO. : 16/948488
DATED : November 2, 2021
INVENTOR(S) : Desserrey et al.

Page 1 of 1

It is certified that error appears in the above-identified patent and that said Letters Patent is hereby corrected as shown below:

In the Claims

In Column 31, Line 21, in Claim 11, delete "claim/wherein" and insert --claim 8 wherein-- therefor Signed and Sealed this
Eighth Day of March, 2022

Drew Hirshfeld
*Performing the Functions and Duties of the
Under Secretary of Commerce for Intellectual Property and
Director of the United States Patent and Trademark Office*